(12) United States Patent
Menchen

(10) Patent No.: US 11,034,853 B2
(45) Date of Patent: Jun. 15, 2021

(54) MONOLAYER POLYMERIC COATINGS FOR MODIFYING METAL OXIDE SURFACES

(71) Applicant: Quantapore, Inc., South San Francisco, CA (US)

(72) Inventor: Steven Menchen, South San Francisco, CA (US)

(73) Assignee: Quantapore, Inc., South San Francisco, CA (US)

(*) Notice: Subject to any disclaimer, the term of this patent is extended or adjusted under 35 U.S.C. 154(b) by 128 days.

(21) Appl. No.: 16/473,614

(22) PCT Filed: Jan. 30, 2018

(86) PCT No.: PCT/US2018/015987
§ 371 (c)(1),
(2) Date: Jun. 25, 2019

(87) PCT Pub. No.: WO2018/148063
PCT Pub. Date: Aug. 16, 2018

(65) Prior Publication Data
US 2020/0148910 A1   May 14, 2020

Related U.S. Application Data

(60) Provisional application No. 62/455,747, filed on Feb. 7, 2017.

(51) Int. Cl.
*C09D 133/26* (2006.01)
*C08F 220/56* (2006.01)
*C09D 5/00* (2006.01)

(52) U.S. Cl.
CPC .......... *C09D 133/26* (2013.01); *C08F 220/56* (2013.01); *C09D 5/00* (2013.01); *C08F 2800/10* (2013.01); *C08F 2810/50* (2013.01)

(58) Field of Classification Search
None
See application file for complete search history.

(56) References Cited

U.S. PATENT DOCUMENTS 5,552,028 A * 9/1996 Madabhushi .... G01N 27/44747
204/451
5,567,292 A * 10/1996 Madabhushi .... G01N 27/44747
204/451

(Continued)

FOREIGN PATENT DOCUMENTS

WO   WO 2018/148063   8/2018

*Primary Examiner* — Satya B Sastri
(74) *Attorney, Agent, or Firm* — Stephen C. Macevicz; Vincent M. Powers; Levine Bagade Han LLP

(57) ABSTRACT

The invention is directed to methods of modifying metal oxide or hydroxylated polymer surfaces using compositions of water soluble polymers that adsorb onto such surfaces and that contain functional groups which directly modify such surfaces without further processing. In some embodiments, compositions used in such methods include water-soluble oxide-adsorbing polymers having water solubility in an indicated temperature range, an indicated concentration in the aqueous solution, and a molecular weight range, wherein each of the water-soluble oxide-adsorbing polymers comprises a linear copolymer comprising a first monomer having at least one hydrophilic moiety and a second monomer having at least one lipophilic moiety and wherein a first monomer: second monomer molecular ratio is at least 3:1.

16 Claims, 4 Drawing Sheets

(56) References Cited

U.S. PATENT DOCUMENTS

| | | | | |
|---|---|---|---|---|
| 5,728,431 | A | * | 3/1998 | Bergbreiter ............ B05D 1/185 427/327 |
| 5,916,426 | A | * | 6/1999 | Madabhushi .... G01N 27/44752 204/451 |
| 6,355,709 | B1 | * | 3/2002 | Madabhushi .... G01N 27/44747 524/104 |
| 6,358,385 | B1 | * | 3/2002 | Madabhushi .... G01N 27/44747 204/450 |
| 7,045,048 | B2 | * | 5/2006 | Madabhushi .... G01N 27/44747 204/450 |
| 7,863,357 | B2 | * | 1/2011 | Madabhushi .... G01N 27/44747 524/104 |
| 8,173,198 | B2 | | 5/2012 | Menchen et al. |
| 2004/0146715 | A1 | * | 7/2004 | Guire .................... B82Y 40/00 428/412 |
| 2008/0176761 | A1 | | 7/2008 | Menchen et al. |
| 2011/0192725 | A1 | * | 8/2011 | Madabhushi .... G01N 27/44747 204/454 |

\* cited by examiner

MONOLAYER POLYMERIC COATINGS FOR MODIFYING METAL OXIDE SURFACES

CROSS-REFERENCE TO RELATED APPLICATIONS

This application is a U.S. national application filed under 35 U.S.C. 371 to PCT International Application No. PCT/US2018/015987, filed Jan. 30, 2018, which claims benefit of priority to U.S. Provisional Patent Application No. 62/455,747 filed Feb. 7, 2017, the content of which is incorporated by reference in its entirety.

BACKGROUND

Monolayer polymeric coatings, such as self-assembled monolayers (SAMs), are powerful means for modifying properties of surfaces, especially of materials used in analytical devices which may have useful bulk properties but possess surfaces that interact unfavorably with analytes or other reactants in contact with the device. Many bioanalytic devices are fabricated efficiently using micromachining and semiconductor manufacturing techniques and may have, or may develop, metal oxide surfaces that have unfavorable adsorption properties with respect to biomolecules, particularly proteins, or that lack functional groups desired for an analytical process. Typically such surfaces adsorb and retain proteins readily which has led to the development of a variety purpose-specific coatings, including SAMs, which have been designed to minimize such adsorption.

In view of the above, the field of bioanalytical devices would be advanced by the availability of new polymer compositions capable of forming monolayers on metal oxide surfaces from an aqueous solution wherein such compositions are capable of conveniently delivering a wide variety of surface modifying groups to such surfaces. In particular, such new compounds would enable more efficient fabrication of hybrid nanopore devices comprising solid-state and protein components.

SUMMARY OF THE INVENTION

The present invention is directed to metal oxide surface modifying water soluble polymers and applications thereof. The present invention is exemplified in a number of implementations and applications, some of which are summarized below and throughout the specification.

In one aspect the invention is directed to a method of disposing a polymeric monolayer on a metal oxide or hydroxylated polymer surface comprising contacting such surface with an organic-aqueous solution containing one or more water-soluble oxide-adsorbing polymers having (i) water solubility in a temperature range between about 20° C. and about 50° C., (ii) a concentration in the aqueous solution in a range between about 0.001% and about 10% weight/volume, and (iii) a molecular weight in the range between about $5\times10^3$ and about $1\times10^6$ daltons; wherein each of the water-soluble oxide-adsorbing polymers comprises a linear copolymer comprising a first monomer having at least one hydrophilic moiety and a second monomer having at least one protected functionality and wherein a first monomer:second monomer molecular ratio is at least 3:1; and wherein after adsorption under aqueous conditions.

In another aspect the invention is directed to a method of disposing a lipophilic coating on a metal oxide or hydroxylated polymer surface comprising contacting such surface with an orgainic-aqueous solution containing one or more water-soluble oxide-adsorbing polymers having (i) water solubility in a temperature range between about 20° C. and about 50° C., (ii) a concentration in the aqueous solution in a range between about 0.001% and about 10% weight/volume, (iii) a molecular weight in the range between about $5\times10^3$ and about $1\times10^6$ daltons; wherein each of the water-soluble oxide-adsorbing polymers comprises a linear copolymer comprising a first monomer having at least one hydrophilic moiety and a second monomer having at least one lipophilic moiety and wherein a first monomer:second monomer molecular ratio is at least 3:1. In some embodiments, the at least one lipophilic moiety is C12 to C20 alkyl and first monomer is a (N,N-dialkyl)acrylamide or a vinylpyrrolidone.

In another aspect, the invention is directed to a method of coating a metal oxide or hydroxylated polymer surface with a surface-modifying group comprising the steps of: (a) forming a polymer composition comprising water-soluble oxide-adsorbing polymers each comprising a linear copolymer comprising a first monomer having at least one hydrophilic moiety and a second monomer having at least one protected functionality, wherein each water-soluble oxide-adsorbing polymer of the composition has a first monomer:second monomer molecular ratio of at least 3:1; (b) activating the reactive functionalities of the linear copolymer (e.g. by deprotecting the functionality to form a reactive functionality); (c) reacting a surface-modifying group with the reactive functionalities to form a surface-modifying polymer composition which has (i) water solubility in a temperature range between about 20° C. and about 50° C.; (ii) a concentration in the aqueous solution in a range between about 0.001% and about 10% weight/volume; and (iii) a molecular weight in the range between about $5\times10^3$ and about $1\times10^6$ daltons; and (d) exposing in an organic-aqueous solution the metal oxide or hydroxylated polymer surface to the surface-modifying polymer composition. A surface-modifying polymer composition or a surface-modifying moiety of such a composition may change or modify any of the following surface properties of a solid surface to which it is applied: hydrophilicity, surface charge, surface energy, biocompatibility, and reactivity. In some embodiments of particular interest are surface-modifying compositions and/or moieties that change or modify the hydrophilicity of a target surface. In some embodiments of particular interest are surface-modifying compositions and/or moieties that change or modify the biocompatibility of a target surface.

These above-characterized aspects, as well as other aspects, of the present invention are exemplified in a number of illustrated implementations and applications, some of which are shown in the figures and characterized in the claims section that follows. However, the above summary is not intended to describe each illustrated embodiment or every implementation of the present invention.

DETAILED DESCRIPTION

Figure 1:
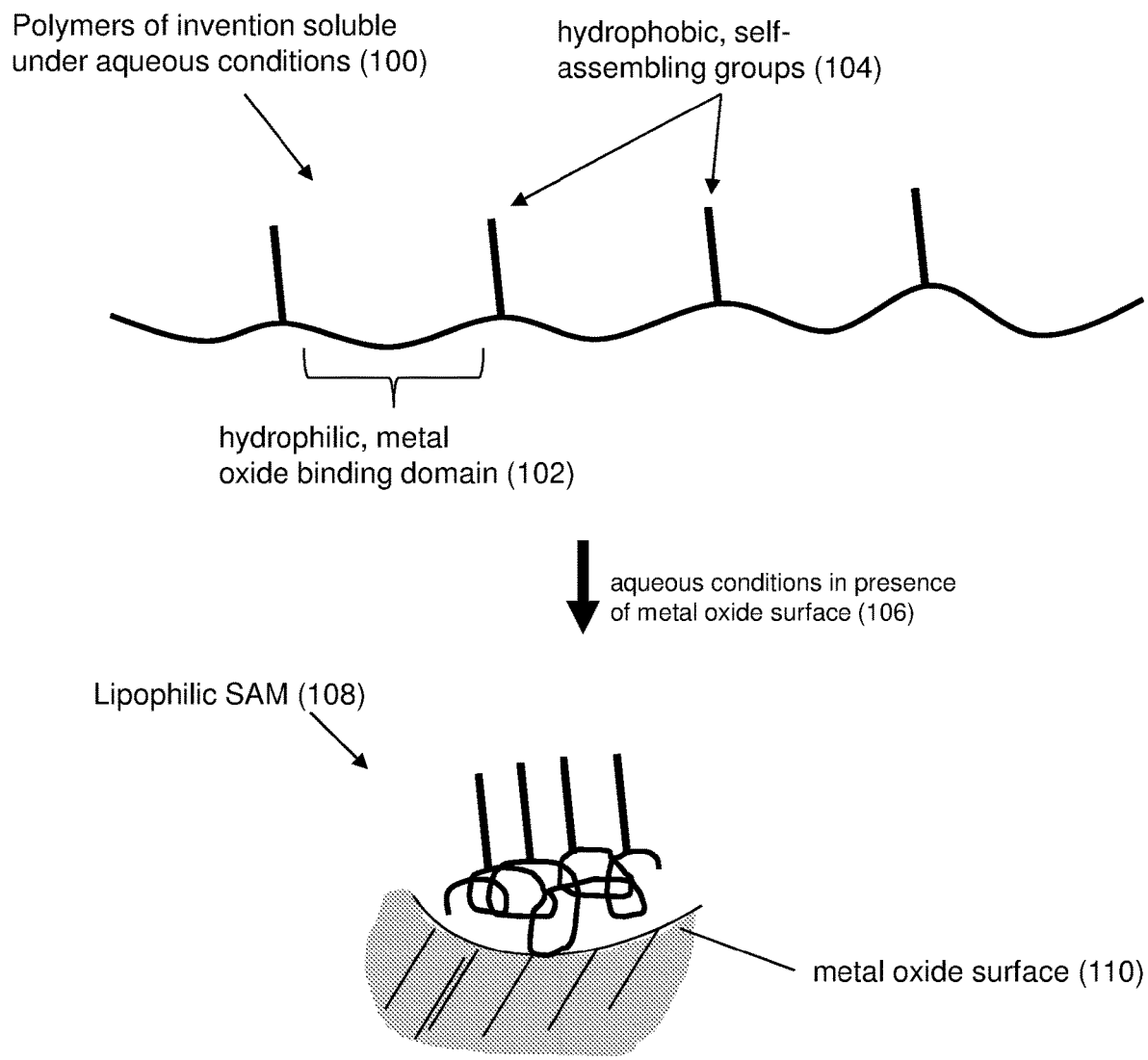
FIG. 1 gives and overview of one aspect of the invention.

While the invention is amenable to various modifications and alternative forms, specifics thereof have been shown by way of example in the drawings and will be described in detail. It should be understood, however, that the intention is not to limit the invention to the particular embodiments described. The intention is to cover all modifications, equivalents, and alternatives falling within the spirit and scope of the invention.

In some embodiments, the invention is directed to compositions of water soluble polymers that adsorb onto metal oxide or hydroxylated polymer surfaces and that contain functional groups which directly modify such surfaces without further processing or that contain protected functionalities which may be activated and reacted with complementary moieties which, in turn, modify such surfaces. The type of surface modification may vary widely and includes, without limitation, modifying surface charges, modifying hydrophilicity or hydrophobicity, modifying surface accessibility, adding ligands for binding selected analytes, and the like.

In some embodiments, the invention is directed to the use of polymers of the above polymers to fabricate bioanalytical devices, such as devices incorporating protein components and nanostructures, such as nanopores.

An overview of some embodiments of the invention is provided in FIG. 1. In some embodiments, the invention is directed to compositions comprising water soluble polymers (100) containing hydrophilic metal oxide-binding domains and hydrophobic groups (104) capable of self-assembly or aggregation when polymer (100) adsorbs (106) onto metal oxide surface (110), thereby forming lipophilic self-assembled monolayer (108) on metal oxide layer (110). In some embodiments, polymers of the invention may be used to form lipophilic monolayers on a wide variety of hydroxylated surfaces including those of hydroxylated polymers, metal oxides and surfaces containing groups (MnOm) with M a metal atom, O is oxygen, and n, m>0. Exemplary metal oxides include, but not limited to, $SiO_2$, $Al_2O_3$, $SiN_x$, $HfO_2$, $TiO_2$, silica, and the like.

The hydrophilic metal oxide-binding domains of polymers of the invention may belong to a variety of chemical classes, such as those described in the following references: Molyneux, Water-Soluble Synthetic Polymers: Properties and Behavior, Volumes I and II (CRC Press, Boca Raton, 1982); Davidson, Editor, Handbook of Water-Soluble Gums and Resins (Mcraw-Hill, New York, 1980); Franks, editor, Water. A Comprehensive Treatise (Plenum Press, New York, 1973); and the like. In some embodiments, water-soluble metal oxide-adsorbing domains include, but not limited to, N,N-disubstituted polyacrylamides, N-monosubstituted polyacrylamides, polymethacrylamide, polyvinylpyrrolidone, and the like. Exemplary substituents of the polyacrylamides include C1 to C12 alkyl; halo-substituted C1 to C12 alkyl; methoxy-substituted C1 to C12 alkyl; hydroxyl-substituted C1 to C12 alkyl and the like. Preferably, the halo substituent is fluoro and the hydroxyl-substituted C1 to C12 alkyl is monosubstituted. It is understood that the above monomer substituents and the lipophilic self-assembling groups are selected so that the resulting polymer is water soluble. For example, it is clear that C12 alkyl-containing monomer could only be present as a small fractional component of a copolymer, for example, 10 percent by weight or less; or in other embodiments, 5 percent by weight or less; or in other embodiments, 2 percent by weight or less. More preferably, exemplary substituents are selected from the group consisting of C1 to C3 alkyl; halo-substituted C1 to C3 alkyl; methoxy-substituted C1 to C3 alkyl; and hydroxyl-substituted C1 to C3 alkyl.

As noted above, a copolymer of the invention may comprise a second monomer having at least one protected functionality, which may be employed, for example, to facilitate reactions, or coating steps, or the like. Exemplary functionalities include, but are not limited to, carbonyl, amino, thiol, carboxyl, hydroxyl, phosphoryl, and the like. Thus, exemplary protected functionalities include, but are not limited to, protected amino, protected carboxyl, protected thiol, protected carbonyl, protected hydroxyl, protected phosphoryl, and the like. In some embodiments, protected functionalities include a protected amino or a protected thiol. In accordance with some embodiments, in certain steps, such functionalities may protected by conventional protection groups to form protected functionalities. Guidance for the selection of protection groups of these and other functionalities (to thereby form "protected functionalities") may be found in standard treatises in organic chemistry, such as Wuts, "Green's Protection Groups in Organic Synthesis, $5^{th}$ edition (Wiley, 2014). In some embodiments, methods of the invention include further steps of deprotecting a protected functionality (to form a reactive functionality) and reacting the deprotected (or reactive) functionality with a complementary functionality (e.g. as described in U.S. Pat. No. 5,188,934, which is incorporated herein by reference) to form a final product or coating. A complementary functionality is simply a group that preferentially reacts with a functionality to form a bond or linking moiety, for example, between a second monomer and a surface-modifying group.

Aqueous solvents in which polymers of the invention are soluble may include various concentrations of salts and/or buffer systems to control pH. In some embodiments, polymers of the invention form stable self-assembled monolayers on metal oxide surfaces in solutions containing up to 1 molar salt concentration and over a temperature range of from about 20° C. to about 50° C. Exemplary pH buffers include aqueous solutions of organic acids, such as citric, acetic, or formic acid; zwitterionics, such as TES (N-tris[hydroxymethyl]-2-aminoethanesulfonic acid, BICINE (N,N-bis[2-hydroxyethyl]glycine, ACES (2-[2-amino-2-oxoethyl)-amino]ethanesulfonic acid), or glycylglycine; inorganic acids, such as phosphoric; and organic bases, such as Tris (Tris[hydroxymethyl]aminomethane) buffers, e.g. available from Sigma. Buffer concentration can vary widely, for example between about 1 mM to 1 M, but are typically about 20 mM. In addition, the aqueous deposition solvent systems can contain water miscible organic co-solvents such as methanol, ethanol, DMF, DMSO, and the like, where the solvent systems can comprise up to 90% of the organic solvent.

In some embodiments, lipophilic domains of polymers of the invention may vary widely subject to water solubility of the total polymer. In some embodiments, relatively larger alkyl-containing moieties (e.g. C8-C20) are sparsely attached (e.g. on average every 5th monomer or greater) to a hydrophilic polymer backbone. In some embodiments, lipophilic domains may be the same or different and selected from C10 alkyl, C11 alkyl, C12 alkyl, C13 alkyl, C14 alkyl, C15 alkyl, C16 alky, C17 alkyl, C18 alkyl, C19 alkyl, or C20 alkyl. In some embodiments, the ratio of hydrophilic monomer to lipophilic monomer is at least 3:1; in other embodiments, the ratio is at least 5:1; in other embodiments, the ratio is at least 10:1; in other embodiments, the ratio is at least 20:1.

Polymers of the invention may be synthesized by conventional techniques, e.g. as disclosed in Odian, Principles of Polymerization, Third Edition (John Wiley, New York, 1991). In some embodiments, copolymers are formed from alkenyl monomers by free-radical polymerization using a conventional initiator, wherein at least one monomer has a hydrophilic moiety and at least one monomer has a functional group for lipophile attachment.

The metal oxide-adsorbing quality of the polymers can be measured in a number of well-known ways, such as by ellipsometry, determining changes in the hydrodynamic properties of adsorbent test particles; determination of adsorption isotherms, or like methods. Such techniques are described in Malmsten et al, Macromolecules, 25: 2474-2481 (1992); Rob and Smith, European Polymer J., 10: 1005-1010 (1974); Vincent et al Surf. Colloid Sci., 12: 1-117 (1982); Takahashi et al, Advances in Polymers Science, 46: 1-65 (1982), and like references. An adsorption isotherm is a graphical presentation of the adsorption exerted by an adsorbent on a solution of a given substance at a fixed temperature. The determination of adsorption isotherms require the preparation of solutions of known concentrations of the material whose adsorption is to be measured (the adsorbate). The adsorbate solutions are combined with known quantities of the material (the adsorbent) whose surface the adsorbate adheres to. Once an equilibrium is reached between the adsorbate in solution and the adsorbate on the surface of the adsorbent, the concentration of the adsorbate solution is determined. The reduction in concentration of the solution is a measure of the degree of adsorption of the adsorbate under the standard conditions.

For polymer compositions designed to delivery a lipophilic coating, lipophilicity of a resulting surface may be measured or compared by contact angle measurements under a set of standard conditions, e.g. as taught by Forch et al, Surface Design; Applications in Bioscience and Nanotechnology (Wiley-VCH Verlag, 2009).

Schemes for Synthesis of Surface Modifying Water Soluble Polymers

In some embodiments, polymers of the invention may be synthesized in one step or in 3 steps. In the one step method, $R_1$ comprises the water solubilizing moiety that further imparts metal oxide binding characteristics to the water-soluble polymer, and $R_2$ comprises the surface modifying moiety, such as a lipophilic moiety. In the three step method, $R_1$ is the same as above, and $R_2$ comprises a functional group that can be further modified into the desired surface modifying moiety: if $R_2$ is a carboxylic acid, the $1^{st}$ step is polymerization, the $2^{nd}$ step is activation of the carboxylate to an active ester, the $3^{rd}$ step is condensation of the active ester with an amine containing the desired $R_2$ that is obtained in the 1-step method; if $R_2$ is a protected amine, the $1^{st}$ step is polymerization, the $2^{nd}$ step is de-protection of the amine, the $3^{rd}$ step is condensation of the amine with an acid chloride, acid NHS ester, or alkyl-halide containing the desired $R_2$ that is obtained in the 1-step method. A ratio of first and second monomers (i.e., the value of m) is selected so that the desired solubility and degree of surface-coating of the end product is obtained. After synthesis, a polymer composition may undergo further conventional processing steps, such as, isolation, size separation, filtration, or other purification or enrichment steps, after which it is solubilized in a suitable aqueous mixture for application to a surface.

Below, several synthesis schemes are described in more detail.

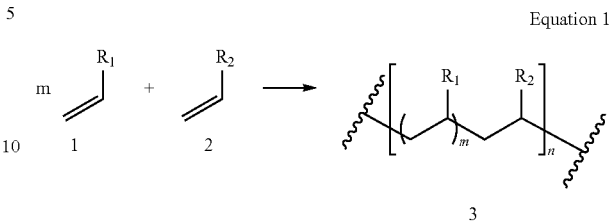

Equation 1

In some embodiments of the scheme of Equation 1, $R_1$ may be an N,N-disubstituted acrylamide, such as an N,N-dimethyl substituted to give (N,N-dimethyl)acrylamide (DMA) as (1). In other embodiments, $R_1$ may be a pyrrolidone to give vinylpyrrolidone as (1). m may be selected in the range of 5-100 and n>5.

In some embodiments, as mentioned above, polymers of the invention may be synthesized in one step. For example, R1 may be (N,N-disubstituted)acrylamide and/or pyrrolidone and R2 may have the following form:

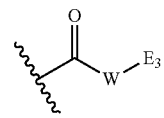

wherein W is a linking group and $E_3$ is a hydrophobic alkyl group, for example, C8-C20.

In some embodiments, $R_2$ of Equation 1 may have the form:

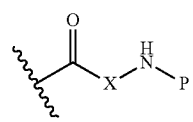

wherein X is a linking group and P is a protecting group that may be removed after polymerization to produce polymer (4) with reactive amines ($R_3$) as illustrated in the following equation:

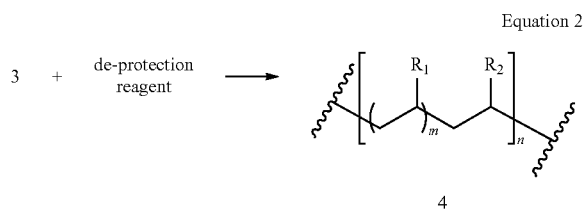

Equation 2

In some embodiments of the scheme of Equation 2, polymer (4) may be used in a variety of reactions to produce further polymers of the invention, such as illustrated in the following Equation 3:

Equation 3

4 + R$_4$—L →

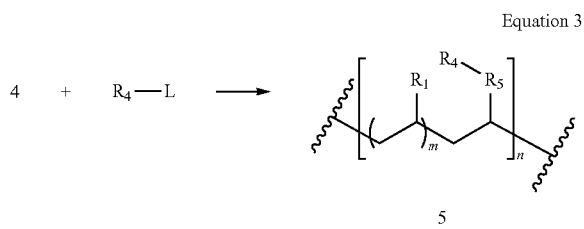

5 where R$_4$-L is a reagent comprising Y-E$_3$ (as defined above) and L=Y is a leaving group such as halide, tosylate or mesylate, and polymer (4) is converted into polymer (5) with R$_4$=E$_3$ (as defined above) and R$_5$ is a secondary amine.

A further example is illustrated in the following Equation 4:

Equation 4

4 + R$_6$—L →

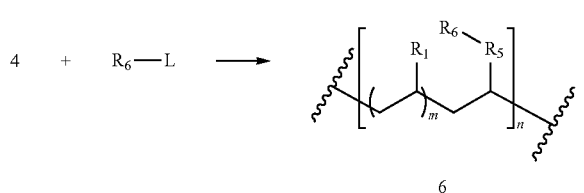

6 wherein R$_6$ is a reagent comprising the group:

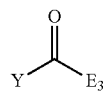

such that E3 is defined as above and L=Y is leaving group such as halide or N-hydroxysuccinimide. Thus, polymer (4) is converted into polymer (6) with R5 a secondary amide.

In some embodiments, further polymers of the invention may be assembled from polymer (3) as shown in Equation 5:

Equation 5

3 + activation reagent →

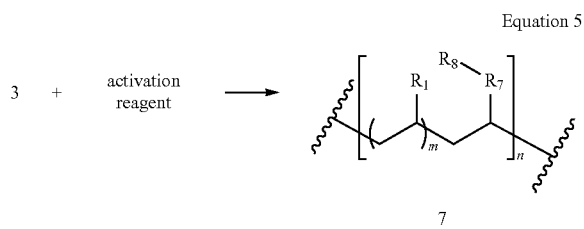

7 wherein R$_2$ of polymer (3) is carboxylate and is treated with an activation reagent, such as disuccinimidyl carbonate or TSTU, to yield polymer (7), which comprises an active ester derivative R$_7$-R$_8$, where R$_7$-R$_8$ is as follows:

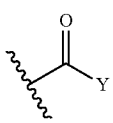

wherein Y is a leaving group, such as halide or N-hydroxysuccinimide.

In some embodiments, further polymers of the invention may be produced by combining activated polymer (7) with alkylamine, H$_2$N-E$_3$ (where E$_3$ may be C8-C20), to yield polymer (8) of Equation 6:

Equation 6

7 + R$_9$ →

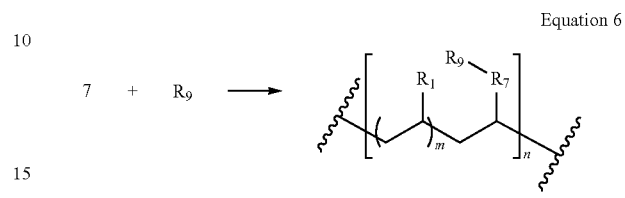

8 wherein R$_7$ is a primary amide and R$_9$ is E$_3$ (which may be C8-C20).

Applications

In some embodiments, polymer compositions of the inventions may be used to provide a passivated surface to mitigate non-specific binding. As example, a poly(dimethylacrylamide) (pDMA) composition known to bind proteins, can be modified with poly(ethyleneoxide) (PEG) groups which are known to mitigate protein binding; thus, pDMA can be used to deliver a passivating monolayer of material to a metal oxide surface.

Figure 2A:
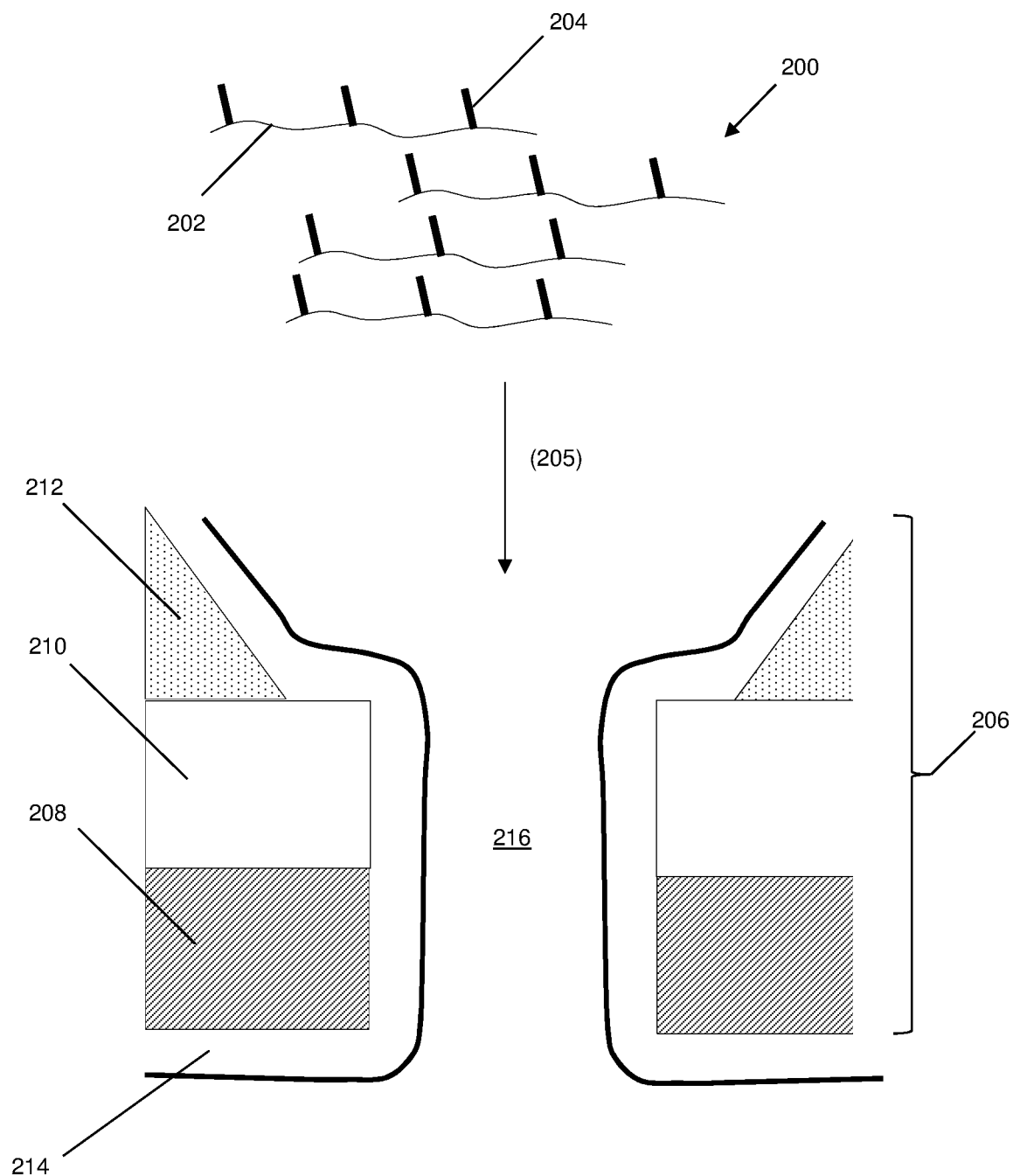
FIGS. 2A-2C illustrate an application of self-assembling surface-modifying polymers of the invention.
Figure 2B:
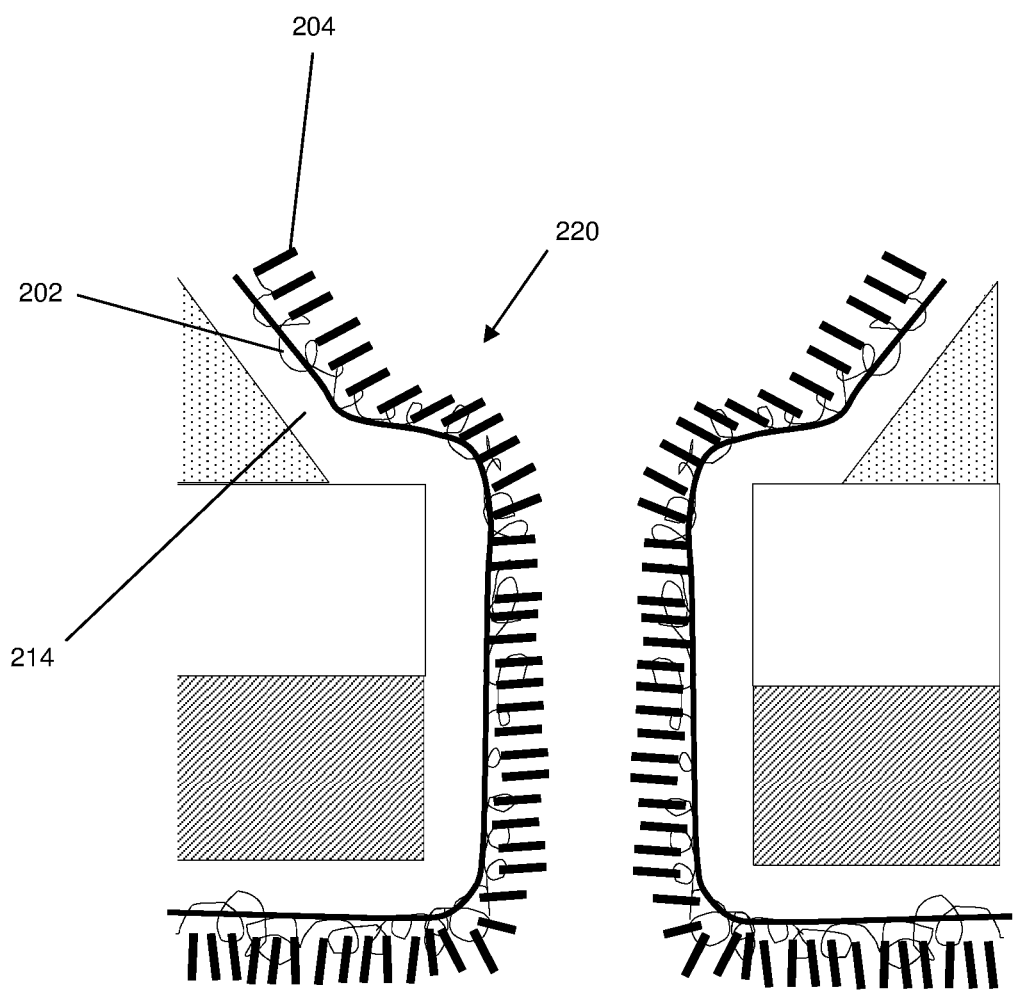
Figure 2C:
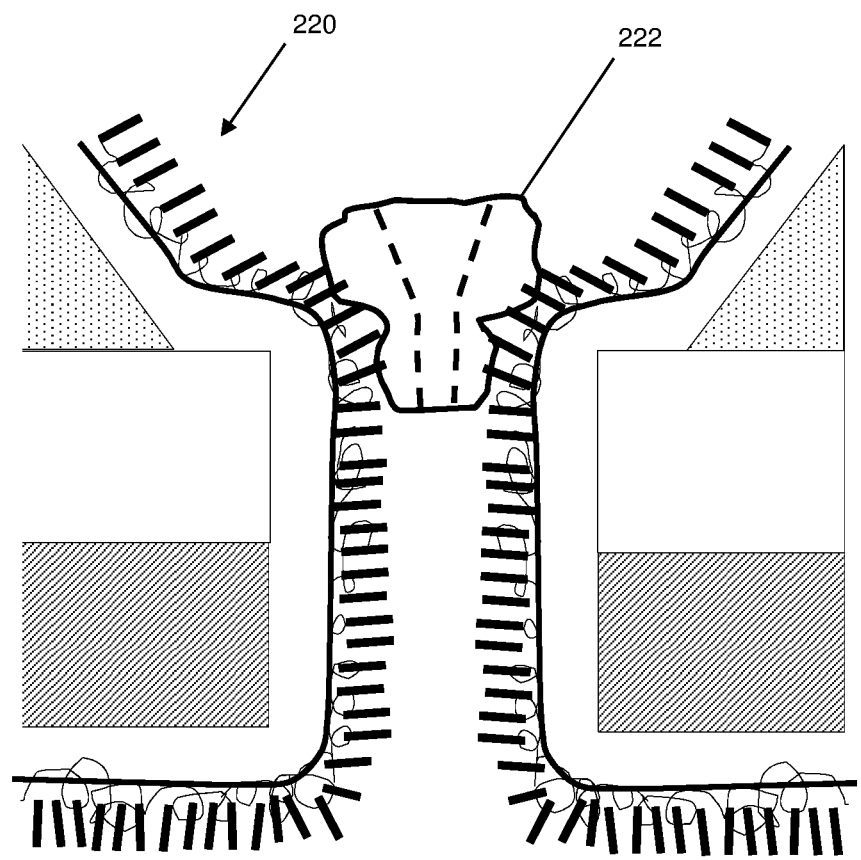

In some embodiments, polymer compositions of the invention may be used to provide a lipophilic coating on a metal oxide-protected solid-state nanopore array. Protein nanopores disposed on the coated surface stably insert into the coated solid-state nanopores. In some embodiments, after such insertion exposed lipophilic surfaces may be passivated by treatment with a surfactant. An embodiment of such an application is illustrated in FIG. 2A, which shows polymer composition (200) of the invention containing polymers having hydrophilic domains (202) and lipophilic groups (204) in an aqueous solution that is applied (205) to solid-state device (206) containing nanopore (216) and having metal oxide coating (214). For example, solid-state device (206) may be a nanopore array comprising silicon layer (212), silicon nitride layer (210) and metal layer (208), which have been encapsulated by metal oxide layer (214) which may be, for example, SiO$_2$. As illustrated in FIG. 2B, upon contact with the polymer solution (200), hydrophilic domains (202) cause the polymer (200) to adsorb onto SiO$_2$ surface (214) and lipophilic groups (204) to aggregate as a monolayer (220). When protein nanopore (222) is combined with device (206) it adsorbs to surface (220), including in energetically stable configuration wherein lipophilic protein domains aggregate with lipophilic groups of layer (220) at nanopores.

EXAMPLE 1

Synthesis of poly((N,N-dimethyl)acrylamide) with Carboxyl Groups for Lipophile Attachment Precursor poly(N,N-dimethyl)acrylamide containing carboxyl groups for lipophile attachment may be synthesized in accordance with the following reaction scheme with first and second monomers in a 9:1 ratio:

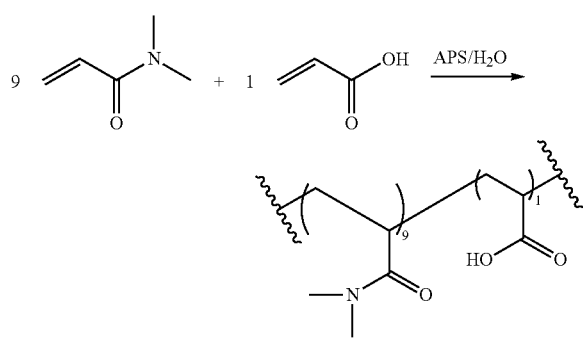

(A)

Poly((N,N-dimethyl)acrylamide) (A) was synthesized as follows: To a 50 mL flask, equipped with a magnetic stir bar, an argon inlet tube, exit tube connected to a gas bubbler, and an internal thermometer, were added 250 mL deionized water and 15 gram of (N,N-dimethyl)acrylamide. This solution was purged with oxygen-free argon for 0.5 hr., and then 0.1 gram sodium sulfite dissolved in 1 mL of water were added. This solution was brought to 40° C. (internal temperature) with magnetic stirring, and then 0.4 gram of ammonium persulfate dissolved in 3 mL of water were added; after addition of the persulfate, the internal temperature was elevated to 65° C. After maintaining the internal temperature between 65-70° C. for 1 hr., 0.65 gram of sodium sulfite dissolved in 5 mL water was added to the thick solution, and the temperature was maintained between 65-70° C. for an additional 15 minutes. After this time, the thick solution was allowed to cool, and the total reaction mixture was dialyzed in 38 cm of Spectra/Por® 2 dialysis membrane (MWCO: 12-14 kD) over a period of 48 hr., where the total volume of exchange deionized water was 4 L, and the water was replenished every 12 hr. (16 L total exchange water volume).

EXAMPLE 2

Attachment of Lipophile to poly((N,N-dimethyl)acrylamide)

Carboxyl groups of precursor of Example 1 may be activated in the following reaction:

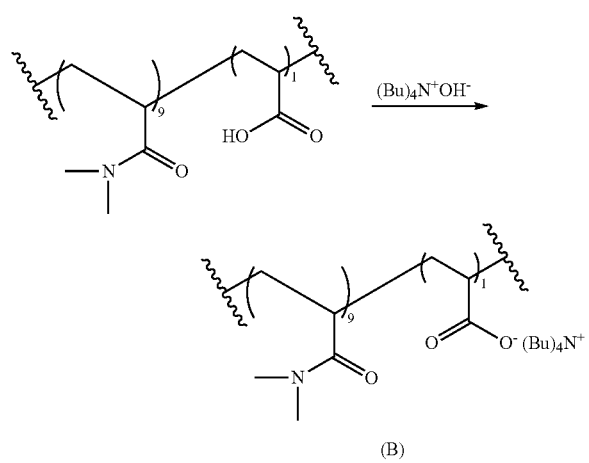

(B)

Synthesis of 20:1 (N,N-dimethyl)acrylamide:acrylic acid co-polymer, tetrabutylammonium salt (B): An identical process was followed as that for the synthesis of poly((N,N-dimethyl)acrylamide)) (A), except that 0.75 gram of acrylic acid and 14.25 gram of (N,N-dimethyl)acrylamide were used in place of 15 gram of (N,N-dimethyl)acrylamide. After completion of the dialysis of the co-polymer, the acid groups were neutralized with the addition of 40% tetrabutylammonium hydroxide in water to pH of 8.4.

The activated carboxyls of (B) are then converted to NHS esters that are reacted with an alkylamine to give the following polymer (C) of the invention:

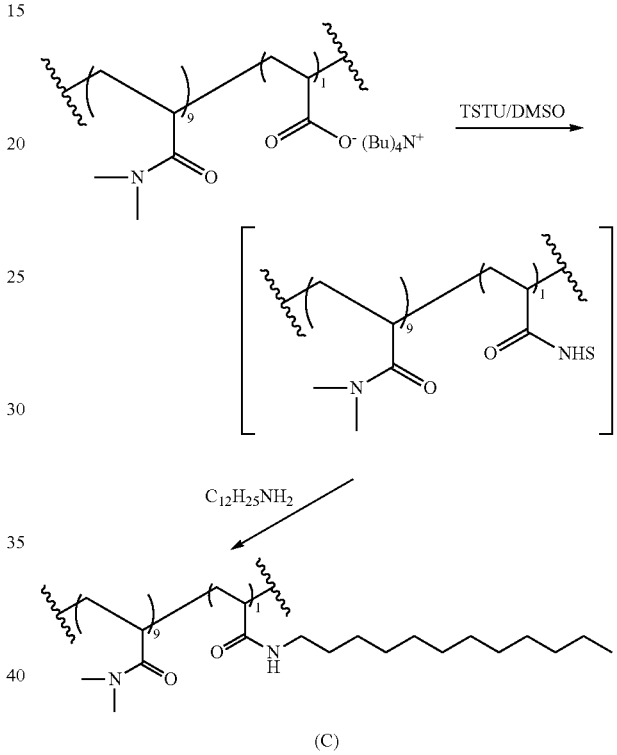

(C)

Synthesis of 20:1 (N,N-dimethyl)acrylamide:(N-dodecyl) acrylamide co-polymer (C) was carried out as follows: The aqueous solution of B was evaporated to dryness (to constant weight @2 mm vacuum, room temperature) yielding a glassy solid. To a solution of 0.57 gram of dry B in 22 gram of dry N-methylpyrrolidone (NMP) was added 120 μL of tributylamine and a solution of 0.15 gram O—(N-Succinimidyl)-N,N,N',N'-tetramethyluronium tetrafluoroborate (TSTU) dissolved in 3 mL of dry NMP was added in one portion. After stirring for 3 hr. at room temperature, a solution of 0.30 gram of dodecylamine in 4 mL of dry NMP was added in one portion. This solution was stirred for 10 hr. at room temperature, and then the reaction mixture was diluted into 80 mL of deionized water. The aqueous suspension was centrifuged yielding small amount water insoluble gluey mass. The aqueous layer was dialyzed in 20 cm of Spectra/Por® 2 dialysis membrane (MWCO: 12-14 kD) over a period of 48 hr., where the total volume of exchange deionized water was 4 L, and the water was replenished every 12 hr. (16 L total exchange water volume). The final product, and aqueous solution of (C), was filtered through a 0.2 u cellulose acetate membrane.

EXAMPLE 3

Synthesis of 20:1 (N,N-dimethyl)acrylamide:(N-hexadecyl)acrylamide Copolymer The process for synthesizing 20:1 (N,N-dimethyl)acrylamide:(N-hexadecyl)acrylamide Co-polymer (D) was identical to the process for the synthesis (C), except that 0.4 gram of hexadecylamine were used in place of 0.2 gram of dodecylamine.

EXAMPLE 4

Synthesis of 20:1 (N,N-dimethyl)acrylamide:(N-PEG-5)acrylamide Copolymer

The process for synthesizing 20:1 (N,N-dimethyl)acrylamide:(N-PEG-5)acrylamide co-polymer (E) was identical to the process for the synthesis (C), except that 0.5 gram of amino-PEG5-alcohol (Broadpharm; CAS #34188-11-9) were used in place of 0.3 gram of dodecylamine.

EXAMPLE 5

Measuring Surface Coating Effectiveness by Contact Angle

The effectiveness of lipophilic surface coatings were determined by measuring contact angles of a water droplet on glass surfaces coated in accordance with the invention. Contact angle measurements were carried out with a conventional contact angle goniometer. Prior to coating, glass microscope slides were soaked overnight in 2% KOH in methanol, followed by washing with DI water, soaking for 12 hr in DI water, and then drying with a hot air heat gun. Dried slides were immersed in 0.1 wt % polymer solutions for a few seconds, rinsed with DI water, and dried with a hot air heat gun prior to contact angle measurements. The various polymer coatings applied to the glass surfaces are indicated in the first column the Table I below and columns 2-5 give contact angle data for the different conditions indicated in the first row at the head of each column.

TABLE I

Contact Angle Summary for DMA 20:1 Copolymers

| Copolymer | Filtered (0.2 u) | 50% EtOH | 30 mM KCl | 30 mM KCl, 50% EtOH |
|---|---|---|---|---|
| Anionic form of copolymer (B) | ~6° | | | |
| Homo-polymer (A) | 15° | N/A | | |
| C12 (C) | 70° | 66° | 76° | 74° | 70° |
| C16 (D) | 80° | 79° | 87° | 77° | 74° |
| (EO)5PEG (E) | 15° | N/A | | |

What is claimed is:

1. A method of disposing a polymeric monolayer on a metal oxide or hydroxylated polymer surface, the method comprising contacting an aqueous or organic-aqueous solution containing one or more water-soluble oxide-adsorbing polymers having (i) water solubility in a temperature range between about 20° C. and about 50° C., (ii) a concentration in the aqueous solution in a range between about 0.001% and about 10% weight/volume, (iii) a molecular weight in the range between about $5 \times 10^3$ and about $1 \times 10^6$ daltons; wherein each of the water-soluble oxide-adsorbing polymers comprises a linear copolymer comprising a first monomer having at least one hydrophilic moiety and a second monomer having at least one protected functionality and wherein a first monomer:second monomer molecular ratio is at least 3:1.

2. The method of claim 1 wherein said first monomer is a (N,N-dialkyl)acrylamide or a vinylpyrrolidone.

3. The method of claim 1 wherein said at least one protected functionality comprises a protected amino, a protected carboxyl, a protected thiol, a protected carbonyl, a protected hydroxyl, or a protected phosphoryl.

4. The method of claim 1 further comprising the steps of deprotecting said protected functionality and reacting the deprotected functionality with a complementary functionality of a surface modifying moiety.

5. The method of claim 4 wherein said surface-modifying moiety is a lipophilic moiety.

6. The method of claim 1 wherein said hydrophilic moiety is the same or different and is selected from the group consisting of C1 to C3 alkyl; halo-substituted C1 to C3 alkyl; methoxy-substituted C1 to C3 alkyl; and hydroxyl-substituted C1 to C3 alkyl.

7. A method of disposing a polymeric monolayer on a metal oxide or hydroxylated polymer surface, the method comprising contacting such surface with an aqueous or an organic-aqueous solution containing one or more water-soluble oxide-adsorbing polymers having (i) water solubility in a temperature range between about 20° C. and about 50° C., (ii) a concentration in the aqueous solution in a range between about 0.001% and about 10% weight/volume, (iii) a molecular weight in the range between about $5 \times 10^3$ and about $1 \times 10^6$ daltons; wherein each of the water-soluble oxide-adsorbing polymers comprises a linear copolymer comprising a first monomer having at least one hydrophilic moiety and a second monomer having at least one surface-modifying moiety and wherein a first monomer:second monomer molecular ratio is at least 3:1.

8. The method of claim 7 wherein said surface-modifying moiety is a lipophilic moiety.

9. The method of claim 8 wherein said lipophilic moiety may be the same or different and is selected from the group consisting of C10 alkyl, C11 alkyl, C12 alkyl, C13 alkyl, C14 alkyl, C15 alkyl, C16 alky, C17 alkyl, C18 alkyl, C19 alkyl, and C20 alkyl.

10. The method of claim 7 wherein said first monomer is a (N,N-dialkyl)acrylamide or a vinylpyrrolidone.

11. A method of disposing a lipophilic coating on a metal oxide or hydroxylated polymer surface, the method comprising contacting such surface with an aqueous or an organic-aqueous solution containing one or more water-soluble oxide-adsorbing polymers having (i) water solubility in a temperature range between about 20° C. and about 50° C., (ii) a concentration in the aqueous solution in a range between about 0.001% and about 10% weight/volume, (iii) a molecular weight in the range between about $5 \times 10^3$ and about $1 \times 10^6$ daltons; wherein each of the water-soluble oxide-adsorbing polymers comprises a linear copolymer comprising a first monomer having at least one hydrophilic moiety and a second monomer having at least one lipophilic moiety and wherein a first monomer: second monomer molecular ratio is at least 3:1.

12. The method of claim 11 wherein said first monomer is a (N,N-dialkyl)acrylamide or a vinylpyrrolidone.

13. A method of coating a metal oxide or hydroxylated polymer surface with a surface-modifying group, the method comprising the steps of:
- forming a polymer composition comprising water-soluble oxide-adsorbing polymers each comprising a linear copolymer comprising a first monomer having at least one hydrophilic moiety and a second monomer having at least one protected functionality, wherein each water-soluble oxide-adsorbing polymer of the composition has a first monomer:second monomer molecular ratio of at least 3:1;
- activating the protected functionalities of the linear copolymer to form reactive functionalities;
- reacting a surface-modifying group with the reactive functionalities to form a surface-modifying polymer composition which has (i) water solubility in a temperature range between about 20° C. and about 50° C.; (ii) a concentration in the aqueous solution in a range between about 0.001% and about 10% weight/volume; and (iii) a molecular weight in the range between about $5 \times 10^3$ and about $1 \times 10^6$ daltons; and
- exposing in an aqueous or an organic-aqueous solution the metal oxide or hydroxylated polymer surface to the surface-modifying polymer composition.

14. The method of claim 13 wherein said first monomer is a (N,N-dialkyl)acrylamide or a vinylpyrrolidone.

15. The method of claim 13 wherein said surface-modifying group is C12 to C20 alkyl.

16. The method of claim 13 wherein said hydrophilic moiety is the same or different and is selected from the group consisting of C1 to C3 alkyl; halo-substituted C1 to C3 alkyl; methoxy-substituted C1 to C3 alkyl; and hydroxyl-substituted C1 to C3 alkyl.

* * * * *